United States Patent [19]

Hara et al.

[11] 4,408,120

[45] Oct. 4, 1983

[54] BAR CODE SCANNER

[75] Inventors: Masahiro Hara; Toshiyasu Sakai, both of Kariya; Atsutoshi Okamoto, Aichi, all of Japan

[73] Assignee: Nippondenso Co., Ltd., Kariya, Japan

[21] Appl. No.: 352,564

[22] Filed: Feb. 26, 1982

[30] Foreign Application Priority Data

Mar. 16, 1981 [JP] Japan .................................. 56-38158

[51] Int. Cl.³ .............................................. G06K 7/10
[52] U.S. Cl. .................................... 235/462; 235/472; 235/454
[58] Field of Search ................. 235/462, 463, 472, 454

[56] References Cited

U.S. PATENT DOCUMENTS 3,684,866  8/1972  Jones .................................. 235/462

Primary Examiner—Harold I. Pitts
Attorney, Agent, or Firm—Cushman, Darby & Cushman

[57] ABSTRACT

A bar code scanner for scanning bar codes having a plurality of parallel bar symbols recorded in different light reflective colors on a record medium. The scanner has a light source, an image sensor comprising a plurality of light responsive elements which are aligned and activated one by one, and diaphragm having an aperture which is longitudinally extending in orthogonal relation with the straight line of the aligned elements.

8 Claims, 5 Drawing Figures

BAR CODE SCANNER

BACKGROUND OF THE INVENTION

The present invention relates to a bar code scanner for scanning bar codes by an electronically activated image sensor, which is used in such a system that articles of merchandise move together with a record medium (for example, labels or the like) affixed thereto and recorded with the bar codes.

In a conventional apparatus for scanning a light reflected from bar codes or contrastive light reflection pattern by an electronically activated image sensor, it is known that an iris diaphragm is provided for projecting enough illuminance on the bar codes so as to clearly image the bar codes on the light responsive elements of the image sensor, and for controling the focal depth of the bar codes image.

While it is generally arranged that the circular aperture of the iris diaphragm is small so as to prevent the defocus of the image or to increase the focal depth, a luminous intensity reflected from bar codes onto the image sensor is reduced by the small aperture and it is required to employ the light source having a large luminous intensity so as to compensate the reduced luminous intensity.

When the aperture of the iris diaphragm is large so as to increase the luminous intensity projecting on the image sensor, the focal depth is reduced and consequently the scanning accuracy is reduced.

SUMMARY OF THE INVENTION

With a view to overcoming the foregoing deficiencies, it is an object of the invention to increase the focal depth without decreasing the luminous intensity of the light reflected from the bar codes onto the image sensor, and thus provide the bar code scanner with greater scanning accuracy.

BRIEF DESCRIPTION OF THE DRAWINGS

In the above drawings, the same reference numerals are used to indicate the same or equivalent parts.

DESCRIPTION OF THE PREFERRED EMBODIMENTS

In the optical system according to the present invention, in which the scanned image of bar codes illuminated by the light source is orthogonally imaged on the straight aligned light responsive elements of the image sensor, an aperture of the diaphragm member extending in an orthogonal relation with the elements of image sensor.

Figure 1:
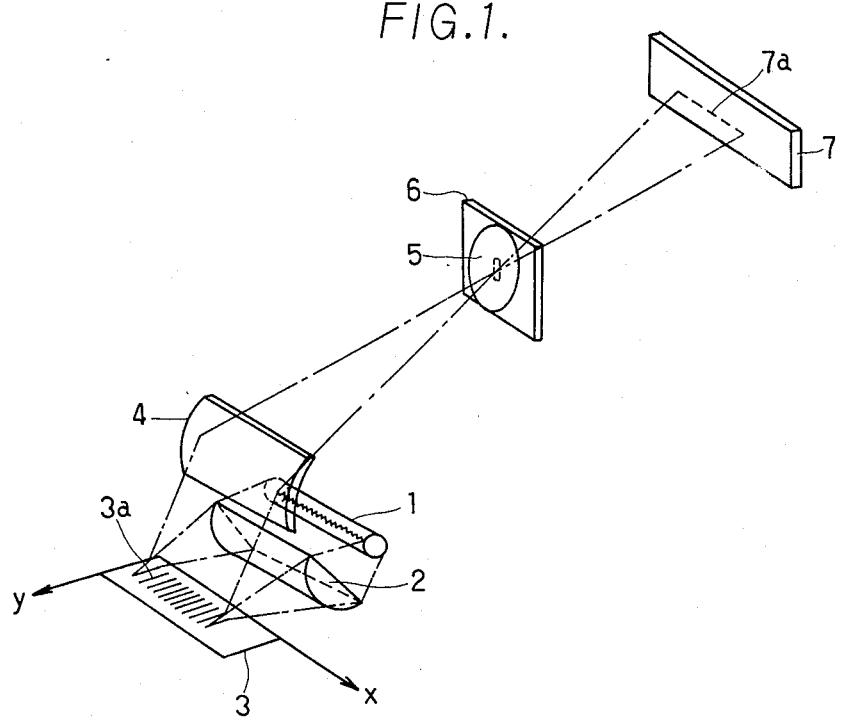
FIG. 1 is a schematic view illustrating the general positions for explanation of the optical system according to the invention.
Figure 2:
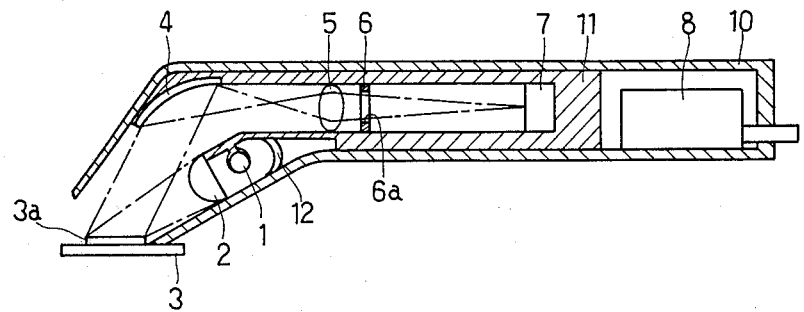
FIG. 2 is a sectional view illustrating the detailed construction of the invention; and, FIGS. 3–5 are plan views illustrating the first to third embodiments of diaphragm means in FIG. 2.

The present invention will now be described in greater detail with reference to the illustrated embodiments. Referring first to FIGS. 1 and 2, numeral 1 designates a light source such as a bar-shaped lamp which illuminates bar codes 3a printed on a bar code label 3 through a light collector lens 2 of semi-cylindrical shape. The bar codes 3a comprise a plurality of parallel bar symbols recorded in white and in black which are contrastive colors in light reflectivities, and the bar symbols play as a coding with the colors and the widths thereof. Numeral 4 designates a concave reflector mirror for reflecting the reflected light from the bar codes 3a to a specified direction. The light thus reflected by the mirror 4, passing through a convex lens 5 and an aperture 6a of diaphragm member 6, is received by an image sensor 7. As the image sensor 7, a one-directional image sensor is employed for converting the scanned image on a read-in line 7a to an electric signal by means of an electronically scanning operation.

Figure 3:
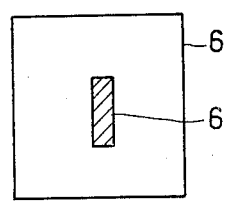

As shown in FIG. 3, the aperture 6a of the diaphragm 6 has a shape of rectangle longitudinally extending in direction orthogonal to the read-in line 7a. A one-dot chain line of optical system in FIG. 1 shows a ray in the scanner according to the present invention. Numeral 8 designates electronically controled circuits for activating the image sensor 7 and processing electric signals therefrom so as to convert to the desired digital signals corresponding to the bar codes 3a. Numeral 10 designates an outer casing made of synthetic resin which may be handled by the operator. Numeral 11 designates an inner casing for supporting the concave reflector mirror 4, the lens 5, the diaphragm member 6, the image sensor 7, the light source 1, the collector lens 2, and a reflector mirror 12 reflecting the light projected by the light source 1 onto the bar code label 3.

In the abovementioned construction, the apparatus is operated in the following manner. When the scanning apparatus is provided at the position as shown in FIG. 2, the light projected by the bar-shaped lamp 1 is converged by the collector lens 2, and illuminates the bar code label 3. Since the bar symbols of the bar codes 3a are recorded in white and in black which are contrastive colors in light reflectivity, the reflected light has corresponding light densities. The reflected light, passing via the concave reflector mirror 4, the lens 5 and the aperture 6a of the diaphragm means 6, is received by the image sensor 7 on the read-in line 7a thereof. The image sensor 7 which is activated by the electronically controled circuits 8 converts the scanned image to electric signals, and the circuits 8 produce the desired digitally coded signals corresponding to the above electric signals.

Since the longitudinal axis of the aperture 6a of the diaphragm means 6 is positioned in direction orthogonal to the straight image-in line 7a of the read sensor 7, the focal depth of the axis X as shown in FIG. 1 (i.e. the width of each bar symbols of the bar codes 3a) becomes wide in response to the decrease of width of the aperture 6a. Furthermore, since the enough luminous intensity is obtained owing to the longitudinal length of the aperture 6a in comparison with the conventional iris diaphragm, the precise scanning is assured and it is not required to employ the light source having large luminous intensity. Still furthermore, since the light reflected by the axis Y of the bar code label 3 is converged on the image sensor 7 by the concave collector mirror 4, it is also seen that even the comparatively small luminous intensity is satisfactory without decreasing the focal depth.

Figure 4:
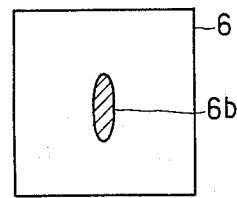
Figure 5:
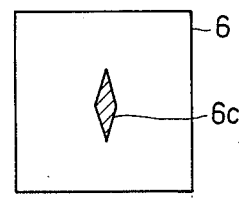

The aperture 6a of the diaphragm means may be further modified as shown in FIGS. 4 and 5. In FIGS. 4 and 5, the diaphragm means 6 has an eliptical aperture 6b or a rhombus aperture 6c, the longitudinal axis of which is extending in parallel with the reflected light of the longitudinal axis of the bar codes 3a.

In place of the lens 5, a concave mirror may be provided for imaging on the image sensor 7.

While the diaphragm means 6 is separate from the lens 5 in the above description, an opaque tape or paint may be applied on the surface of the lens 5 so as to form the diaphragm means 6.

The present invention is not limited to the embodiments described hereinabove but may be modified or altered in many ways without departing from the spirit of the invention.

What is claimed is:

1. In a system for scanning bar codes having a plurality of parallel bar symbols recorded in different light reflective colors, a bar code scanner comprising:
    a casing;
    a light source supported within said casing and illuminating said bar symbols;
    an image sensor supported within said casing and being electronically activated one by one to convert reflected light applied from said parallel bar symbols into responsive electric signals, the longitudinal axis of said bar symbols being reflected orthogonally onto the straight read-in line of said image sensor; and
    diaphragm member supported within said casing at a portion between said bar symbols and said image sensor and having an aperture, the longitudinal axis of said aperture extending in orthogonal relation with said straight read-in line of said image sensor.

2. A bar code scanner according to claim 1, wherein said aperture has a rectangular shape.

3. A bar code scanner according to claim 1, wherein said aperture has an eliptical shape.

4. A bar code scanner according to claim 1, wherein said aperture has a rhombus shape.

5. A bar code scanner according to claim 1 further comprising a lens supported within said casing at a position between said bar symbols and said image sensor and focusing the light reflected from said bar symbols onto said image sensor.

6. A bar code scanner according to claim 5, wherein said diaphragm member is formed directly on the surface of said lens.

7. A bar code scanner according to anyone of claims 1 or 5 further comprising a lens supported within said casing at a position between said light source and said bar symbols and converging the light projected by said light source onto said bar symbols.

8. In a system for scanning bar codes having a plurality of parallel bar symbols recorded in contrastive light reflection colors, a bar code scanner comprising:
    a casing;
    a light source supported within said casing and illuminating said bar symbols;
    an image sensor supported within said casing and being electronically activated one by one to convert reflected light applied from said parallel bar symbols into responsive electric signals, the longitudinal axis of said bar symbols being reflected orthogonally onto the straight read-in line of said image sensor;
    diaphragm member supported within said casing at a portion between said bar symbols and said image sensor and having an aperture, the longitudinal axis of said aperture extending in orthogonal relation with said straight read-in line of said image sensor;
    a lens supported within said casing at a position between said bar symbols and said image sensor and focusing the light reflected from said bar symbols onto said image sensor;
    a lens supported within said casing at a position between said light source and said bar symbols and converging the light projected by said light source onto said bar symbols;
    a first reflector mirror supported within said casing and reflecting the light reflected from said bar symbols onto said image sensor; and,
    a second reflector mirror supported within said casing and reflecting the light projected by said light source onto said bar symbols.

* * * * *